Sept. 18, 1962 D. BATZER ETAL 3,054,523
FIELD STORAGE TANKS
Filed Feb. 2, 1959
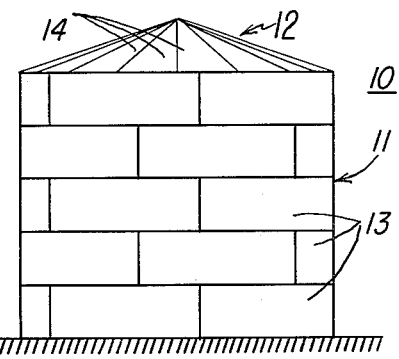
FIG. 1
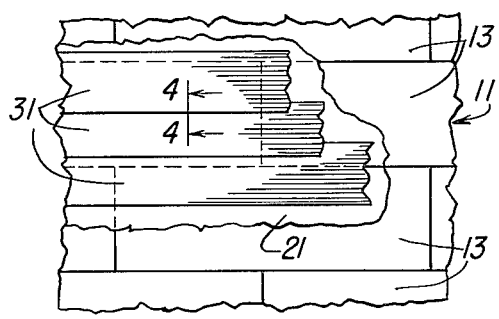
FIG. 2
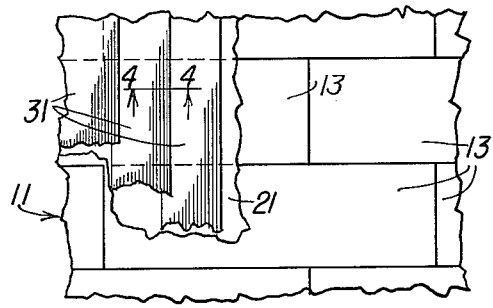
FIG. 3
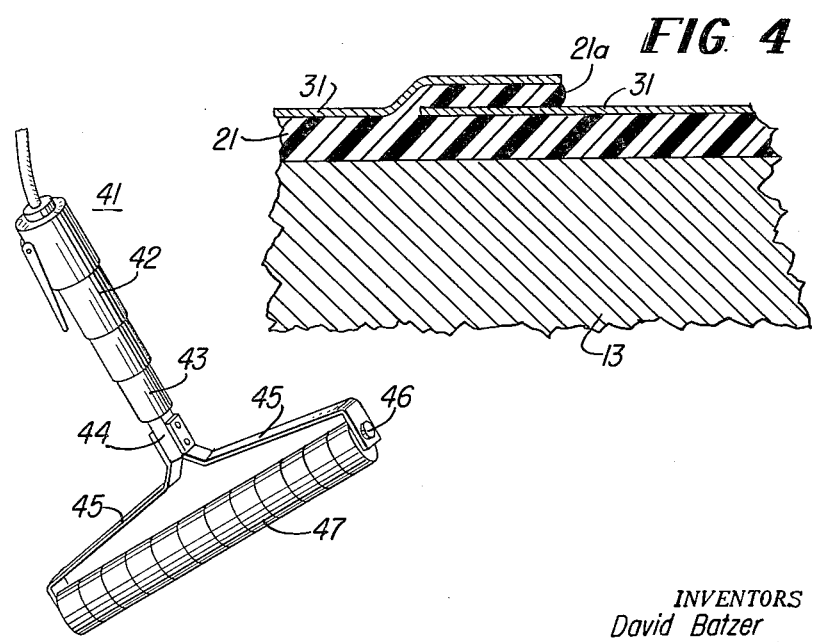
FIG. 4
FIG. 5
INVENTORS
David Batzer
Joseph R. Sproul
BY
Prangley, Baird, Clayton, Miller & Vogel,
Attys.

United States Patent Office 3,054,523
Patented Sept. 18, 1962

3,054,523
FIELD STORAGE TANKS
David Batzer, Dyer, and Joseph R. Spraul, Munster, Ind., assignors to General American Transportation Corporation, Chicago, Ill., a corporation of New York
Filed Feb. 2, 1959, Ser. No. 790,595
4 Claims. (Cl. 220—10)

The present invention relates to field storage tanks carrying improved exterior coatings for protecting the same against corrosion, and particularly against the corrosive effects of the natural elements of weather.

It is a general object of the invention to provide an improved arrangement for protecting a supporting member (such as the wall of a field storage tank) that is formed essentially of iron from corrosive attack by the natural elements of weather to which it is exposed in the natural use thereof.

Another object of the invention is to provide in a field storage tank, or the like, a composite wall of improved construction and arrangement so that it is highly resistant to corrosive attack by the natural elements of weather.

Another object of the invention is to provide a composite structure that is exposed to the natural elements of weather and that comprises a supporting member formed essentially of iron, a protective sheath formed of water-impervious abrasion-resistant material that is also substantially more resistant to corrosive attack by the natural elements of weather than is iron, and a substantially continuous layer of water-impervious elastomeric adhesive arranged between the outer surface of the supporting member and the inner surface of the protective sheath and intimately bonded thereto and securing the protective sheath to the supporting member and sealing the space therebetween against the entry of moisture thereinto.

A further object of the invention is to provide a composite structure of the character noted, wherein the elastomeric adhesive layer accommodates substantial expansion and contraction of the supporting member due to corresponding high and low temperatures, without tearing, buckling or other damage of the protective sheath supported thereby.

A further object of the invention is to provide a composite structure of the character noted, wherein the protective sheath is formed of a highly heat-reflective metal foil so that it minimizes the absorption of heat by the supporting wall on bright and hot summer days.

A further object of the invention is to provide a field storage tank of improved construction and arrangement that requires no painting and exceedingly small care to maintain the same in entirely good condition, notwithstanding the exposure thereof to the natural elements of weather in the normal use thereof.

A still further object of the invention is to provide a field storage tank of the character noted that comprises an outer protective sheath that is substantially more resistant to desert sandstorm damage, etc., than paint or other similar coatings.

Further features of the invention pertain to the particular arrangement of the elements of the structure; whereby the above-outlined and additional operating features thereof are attained.

The invention, both as to its organization and method of operation, together with further objects and advantages thereof, will best be understood by reference to the following specification taken in connection with the accompanying drawing, in which:

FIGURE 1 is a side elevational view of a field storage tank that may be provided with a protective sheath and embodying the present invention;

FIG. 2 is an enlarged fragmentary view of the side wall of the tank of FIG. 1, illustrating one manner of applying the outer protective sheath to the outer surface thereof;

FIG. 3 is an enlarged fragmentary view of the side wall of the tank of FIG. 1, illustrating another manner of applying the outer protective sheath to the outer surface thereof;

FIG. 4 is a greatly enlarged fragmentary sectional view of the side wall of the tank and the protective structure carried by the outer surface thereof, taken in the direction of the arrows along the line 4—4 shown in FIG. 2 and in FIG. 3, and illustrating the construction of the overlapped joint between the marginal edges of two adjacent strips of the sheet material that is employed in constructing the outer protective sheath; and FIG. 5 is a perspective view of a pneumatic hammer-roller tool that may be conveniently used in applying and pressing firmly into place the sheet material employed in constructing the outer protective sheath.

Referring now to FIG. 1 of the drawing, there is illustrated a conventional field storage tank 10 that is exposed in use to the natural elements of weather and that comprises an upstanding substantially cylindrical side wall 11 and a fixed upwardly directed cone roof 12. The side wall 11 includes a number of rings or belts of individual plates 13 secured together to provide fluid-tight joints therebetween; and similarly, the cone roof 12 includes a number of individual plates 14 secured together to provide fluid-tight joints therebetween. The periphery of the cone roof 12 is secured to the top edge of the side wall 11 in fluid-tight relation. The plates 13 are normally formed of low carbon steel and secured together by butt welded joints therebetween; and also the plates 14 are normally formed of such steel and are so secured together. The tank 10, as a whole, is fluid-tight and is well-suited to the field storage of petroleum products; and to facilitate the present description, it is hereinafter assumed that the tank 10 is employed for the field storage of such petroleum products as crude oil.

In order to provide the tank 10 with the weather protective arrangement, in the present invention, the outer surface thereof is worked only to the extent that is necessary to remove therefrom any loose material, such as rust, scale, dust, sand, paint flakes, etc.; however, it is not necessary to remove therefrom firmly bonded rust, scale, paint, etc. Specifically, the outer surface of the tank 10 may be worked by employing any convenient step, such as hammering, scraping, grinding, sand-blasting, etc., so long as the loose material is removed therefrom, as noted above. Accordingly, the protective arrangement may be readily applied either to a newly constructed tank following the usual fabrication thereof, or to an old tank that has been in use for many years.

A supply of liquid coating material is provided that is characterized, following application to a support, by prompt setting-up thereof through a tacky condition into a final state in the form of a water-impervious non-fluent elastomeric coating intimately bonded to the support. A suitable such liquid coating material is disclosed in the copending application of David Batzer, Serial No. 790,376, filed February 2, 1959.

This liquid coating material, as disclosed in the Batzer application mentioned, essentially comprises a rubber that is dissolved in a polymerizable monomer, and a preferred formulation thereof is as follows in percent by weight:

Reclaimed rubber _____ 45
Alpha methyl polystyrene _____ 15
Styrene monomer _____ 20
Cobalt napthenate _____ 1
Hexane _____ 19

Accordingly, this composition essentially comprises an uncured or plastic elastomer (reclaimed rubber) and a polymerizable vinyl type monomer (styrene) which is a solvent for the uncured or plastic elastomer, as well as a nonpolymerizable solvent (hexane).

When this liquid material is thus formulated, including the addition of the polymerizing agent (cobalt napthenate) the monomer (styrene) begins to polymerize to produce a product containing polymers of rubber and of polystyrene; whereby the liquid material rapidly sets-up, upon exposure to air, through a tacky condition and into a final state in the form of a water-impervious non-fluent elastomeric mass. Thus when this formulated liquid material is applied as a coating upon a support it rapidly sets-up into a corresponding elastomeric coating intimately bonded to the support. Also by proper control of the additional solvent (hexane) content thereof the initial viscosity of the liquid material may be selectively established so that the coating thereof upon the associated support may be readily controlled to produce the dseired thickness of the elastomeric coating resulting therefrom and intimately bonded upon the support. For example, such elastomeric coatings in the range 5 to 50 mils in thickness are readily produced.

Also there is provided a supply of water-impervious abrasion-resistance preformed sheet material that is also substantially more resistant to corrosive attack by the natural elements of weather than is steel, and such sheet material may conveniently take the form of a foil of a metal selected from the class consisting of aluminum, copper, tin and lead, or it may consist essentially of a film of a synthetic organic resin, such, for example, as polyvinyl chloride, copolymers of vinyl chloride and vinylidene chloride, etc. Alternatively, the sheet material may comprise a laminate of such a foil and of such a film; and one satisfactory such structure comprised a laminate of ½ mil aluminum foil and 2½ mils resin film. Ordinarily, the sheet material has a thickness in the general range 3 to 25 mils; and long strips of the sheet material can be readily handled in widths in the range 4 to 5 ft., when arranged in rolls. A preferred example of such material is bright aluminum foil of a thickness of 6 mils and of a width of 4 ft.; and hereinafter the description will proceed in terms of this example.

Returning now to the method of applying the coating of the present invention, the outer surface of the cylindrical side wall 11 of the tank 10 is prepared by the mere removal of all loose material therefrom, as previously explained. Then a quantity of previously described liquid coating material is formulated including the added polymerizing agent; whereby the liquid material begins to set-up, as previously explained. Immediately a suitable coating of the formulated liquid coating material is applied to the prepared outer surface of the side wall 11, as indicated at 21 in FIGS. 2 and 3. In passing, it is noted that this formulated liquid coating material will ordinarily set-up into its final state in several hours; and it is recommended that the area of the side wall 11 to which the coating 21 is applied be limited to that to which the protective sheath can be applied and finished in a time interval of about 1½ hours, as subsequently described. The liquid coating 21 is normally applied in a thickness so that the finally produced elastomeric coating has a thickness in the range 5 to 50 mils; and a thickness of 20 mils is recommended as a matter of adequacy and economy.

While the material of the coating 21 is still in its tacky condition, shortly following the application of the liquid coating material to the side wall 11, the sheet material is applied thereto and firmly pressed in place; which sheet material, indicated at 31 in FIGS. 2 and 3, may be applied horizontally (as shown in FIG. 2) or vertically (as shown in FIG. 3) or in any other conventional arrangement. As illustrated in FIGS. 2 and 4 and in FIGS. 3 and 4, the strips 31 (described as aluminum foil) are arranged in side-by-side relation with adjacent marginal portions thereof in overlapped relationship and with the coating material extending between the overlapped portions of the strips 31, as indicated at 21a. In the arrangement, as shown in FIG. 4, the marginal edge of the outer strip 31 may overlap the marginal edge of the inner strip 31 by about 2″ with the layer 21a of the adhesive therebetween, as previously noted.

The coating material 21 and the strips 31 are applied sequentially to the adjacent areas of the outer surfaces of the side wall 11 in the manner described above, so as to accommodate the application of the strips 31 to the coating material 21, while the coating material 21 is in a tacky condition; whereby ultimately the protective arrangement is applied to the entire outer surface of the side wall 11. At this time, the coating 21 is substantially continuous with respect to the entire outer surface of the side wall 11 and the strips 31 cooperate to produce a unitary composite sheath upon the outer surface of the coating 21.

The tool 41 shown in FIG. 5 is recommended for use in pressing the strips 31 firmly in place upon the coating 21, while the latter is in tacky condition, as described above; which tool 41 essentially comprises a conventional pneumatic hammer device 42 carrying a vibratory chuck 43 into which there is detachably secured a shank 44 carrying a pair of oppositely directed brackets 45 between which a rod 46 is affixed, the rod 46 carrying a composite roller 47 formed by a number of individual soft rubber disks.

After application of the strips 31 onto the coating 21 in tacky condition, the roller 47 is pressed onto the strips 31 and rolled thereover; and simultaneously the hammer device 42 is operated so that the roller 47 gently hammers or pounds the strips 31 at a high rate as it rolls thereover; whereby the desired firm pressing of the strips 31 into the tacky coating 21 is automatically effected.

In applying the coating 21 and the strips 31 to the side wall 11, it has been found that the use of a "boson's chair" suspended from the roof 12 greatly facilitates these operations rendering these operations easy and economical to carry out.

In the finished protective arrangement applied to the side wall 11 of the tank 10, the elastomeric layer 21 not only constitutes a substantially continuous water-impervious coating upon the outer surface of the side wall 11, but it also constitutes an adhesive layer between the side wall 11 and the composite sheath (produced by the strips 31) and intimately bonded thereto and sealing the space therebetween against the entry of moisture and foreign material thereinto. Furthermore, the portions 21a of the coating 21 respectively extending between the overlapped marginal edges of the strips 31 secure these marginal edges together and seal these joints against the entry of moisture and foreign materials thereinto. Accordingly, the coating 21 constitutes an elastomeric support for the composite sheath carried by the side wall 11 and secures together the individual elements (the strips 31) of this composite sheath.

In view of the foregoing description of the manner of applying the protective arrangement to the outer surface of the side wall 11 of the tank 10, it will be understood that the protective arrangement may be applied in essentially the same manner to the outer surface of the roof 12 thereof.

This protective arrangement for the tank 10 is not only greatly superior to painting or other known schemes for the present purpose, but it is also substantially more economical to carry out; for example, in a recent test involving an oil storage tank (25-ft. in diameter and 24-ft. high) and formed of steel plates, the total cost, including materials, labor, overhead and depreciation, was only 16 cents per square foot. This test involved the applicaiton of an aluminum foil (6 mils) of a width of 4-ft. over an applied elastomeric adhesive coating of the character described of 20 mils average thickness. Obviously, this cost figure is substantially below the normal cost per square foot of paintaing such a fiield storage tank.

This protective arrangement is far superior to painting or other known coating schemes in that it possesses several features that are altogether foreign thereto. For example, the reflectivity of the bright aluminum foil is altogether different from that of aluminum paint, or the like, which feature is very advantageous, as it minimizes the absorption of heat by the oil stored in the fiield storage tank and the consequent reduction of the vapor pressure of the volatile liquids in the tank. Also the resiliency of the elastomeric layer 21 disposed between the rigid side wall 11 of the tank 10 and the composite aluminum sheath 31 prevents damage to the sheath 31 when the tank is subjected to a blow or to the grinding action of sand, as is frequently encountered in desert sandstorms by such field storage tanks. In fact, the composite sheath 31 is capable of withstanding sand-blasting, without damage thereto, that would immediately remove a painted coating from the tank. Moreover, this same characteristic of the elastomeric layer 21 prevents damage to the aluminum sheath when the tank 10 is subjected to a hailstorm that would pound paint therefrom. Further, the protective arrangement is capable of expansion and contraction with the wall 11 in response to wide temperature changes, without tearing, wrinkling, etc. of the aluminum sheath; which characteristics cannot be compared with those of a paint-coating. Finally, even in the event of an accidental puncture of the aluminum sheath, no water or moisture can penetrate the underlying elastomeric coating so that the damage to the sheath does not spread, as by the action of frost, as in the case of a paint-coating.

While the protective coating has been described as being applied to a field storage tank, since these steel structures are especially subject to damage by the natural elements of weather to which they are exposed, it will be understood that the protective arrangement may be applied to other structures that are also subject to weather damage, such as smokestacks, water conduits, fluid transmission pipes, supporting columns, bridge girders, poles, etc.

In view of the foregoing, it is apparent that there has been provided an improved arrangement for protecting a supporting member such, as the wall of a field storage tank, that is formed essentially of iron from corrosive attack by the natural elements of weather to which it is exposed in the normal use thereof.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a field storage tank that is exposed in use to the natural elements of weather, a composite wall comprising an inner supporting sheet formed of steel, a substantially continuous water-impervious elastomeric coating intimately bonded to the outer surface of said supporting sheet, said elastomeric coating comprising a resinous composition consisting essentially of a polymer of a vinyl monomer and a rubber and having a thickness of about 5 to 50 mils, and a protective sheath of composite construction including a plurality of elongated strips of sheet material arranged in side-by-side relation with adjacent marginal portions thereof in overlapped relationship and intimately bonded to the outer surface of said elastomeric coating with said elastomeric coating sealing the space between said supporting sheet and said protective sheath against the entry of moisture thereinto, said protective sheath comprising a water-impervious abrasion-resistant sheet material that is also substantially more resistant to corrosive attack by the natural elements of weather than is steel and having a thickness of about 3 to 25 mils, said elastomeric coating also extending between the adjacent overlapped marginal portions of said strips of sheet material and sealing the joints therebetween against the entry of moisture thereinto.

2. The field storage tank set forth in claim 1, wherein said protective sheath is in the form of a foil of a metal selected from the class consisting of aluminum, copper, tin and lead.

3. The field storage tank set forth in claim 1, wherein said protective sheath is in the form of a film and consists essentially of a synthetic organic resin.

4. The field storage tank set forth in claim 1, wherein said protective sheath is in the form of a laminate of an outer metal foil and an inner synthetic organic resin film.

References Cited in the file of this patent

UNITED STATES PATENTS

| | | |
|---|---|---|
| 1,755,176 | Feldmeier | Apr. 22, 1930 |
| 1,952,705 | Egloff | Mar. 27, 1934 |
| 2,031,553 | Syndergaard | Feb. 18, 1936 |
| 2,047,655 | Von Forster | July 14, 1936 |
| 2,214,330 | Henderson et al. | Sept. 10, 1940 |
| 2,295,103 | Friedly | Sept. 8, 1942 |
| 2,537,466 | Kiefer | Jan. 9, 1951 |
| 2,568,111 | Bond | Sept. 18, 1951 |
| 2,713,383 | Kennedy | July 19, 1955 |
| 2,797,731 | Carlson | July 2, 1957 |
| 2,828,798 | Hopkins | Apr. 1, 1958 |